Patented May 23, 1944

2,349,771

UNITED STATES PATENT OFFICE 2,349,771

PARASITICIDAL PREPARATION

William P. ter Horst, Packanack Lake, N. J., assignor to United States Rubber Company, New York, N. Y., a corporation of New Jersey No Drawing. Application May 23, 1941, Serial No. 394,788

7 Claims. (Cl. 167—30)

This invention relates to new and useful improvements in parasiticidal preparations.

More particularly the invention relates to parasiticides, which may be used as fungicides, seed protectants, insecticides, insect repellents, or bactericides to control harmful bacteria on plants and seeds.

This case is a continuation-in-part of my application Serial No. 234,962, filed October 14, 1938, and of my application Serial No. 283,818, filed July 11, 1939.

The parasiticidal preparations include certain halogen-substituted quinones; also certain halogen-substituted hydroquinones and metallic salts of the latter. They may be used in the form of sprays or dusts, alone or in combination with other fungicides or insecticides, or in combination with fertilizers or other suitable auxiliary agents, spreading agents, etc.

While some of the compounds have outstanding value as fungicides, others of the compounds have outstanding insecticidal value including their use as insect repellents for such pests as the Mexican bean beetle, the Colorado potato beetle, the confused flour beetle, wire worm, corn seed maggot, etc.

The tests tabulated below, demonstrate the effectiveness of the new fungicides in preventing spore germination. The tests were carried out as follows:

An aqueous solution or suspension of the chemical to be tested containing 5 grams thereof per liter of water was prepared. This solution or suspension was sprayed on glass slides which had previously been coated with nitro-cellulose. An atomizer was used capable of delivering 10 cc. of spray liquid in 36 seconds. A glass slide was positioned two feet away from the nozzle of the atomizer. Spraying was carried out for, respectively, 3 seconds, 5½ seconds, 8 seconds, 10½ seconds, and 13 seconds. The spray deposit was allowed to dry. The test organism, for example *Macrosporium sarcinaeforme*, was then placed on the sprayed slide and germination was allowed to take place in a moist chamber at 25° C. On the untreated slides usually approximately 98% of the spores germinated.

| Chemical | Per cent germination after sprays of different duration | | | | |
|---|---|---|---|---|---|
| | 3″ | 5½″ | 8″ | 10½″ | 13″ |
| Tetrachlorhydroquinone | 0.0 | 0.0 | 0.0 | 0.0 | 0.0 |
| Cuprous salt of tetrachlorhydroquinone | 0.0 | 0.0 | 0.0 | 0.0 | 0.0 |
| Zinc salt of tetrachlorhydroquinone | 11.3 | 8.3 | 6.7 | 6.7 | 6.3 |
| Lead salt of tetrachlorhydroquinone | 0.0 | 0.0 | 0.0 | 0.0 | 0.0 |
| Mechanical mixture of 50% tetrachlor-p-benzoquinone + 50% tetrachlorhydroquinone | 0.0 | 0.0 | 0.0 | 0.0 | 0.0 |
| Tetrachlor-p-benzoquinone | 9.3 | 8.3 | 7.0 | 3.3 | 0.6 |

Tetrachlor-p-benzoquinone, although it is a potent fungicide, has severe effects on some plants and seeds. In order to reduce or eliminate plant or seed injury tetrachlor-p-benzoquinone can be used in admixture with an antiacid buffering agent, preferably a mildly alkaline compound, e. g., approximately 1% of disodium phosphate, ammonium phosphate, sodium carbonate, sodium bicarbonate, mono-calcium phosphate, di-calcium phosphate, sodium borate, ammonium oxalate, magnesium oxide, zinc oxide, etc. Plant or seed injury can also be reduced or eliminated by admixture of tetrachlorhydroquinone with the tetrachlorquinone, the mixture being at least as potent fungicidally as the tetrachlorquinone alone. Also, in many instances, the tetrachloro-p-benzoquinone can safely be used alone.

Tetrachlor-p-benzoquinone is highly effective as a seed protectant; the same is true of tetrachlorhydroquinone. The following tests clearly show the effectiveness of these materials as seed protectants.

Pea-seed of the variety "Wilt Resistant Perfection" was dusted with .25% by weight of the new seed protectant. 100 seeds were selected at random and were then placed on moistened Scott toweling, rolled up and placed in a seed incubator running at 20° C. The samples were watered daily and the data were recorded on the sixth day. The untreated seeds gave a germination of 95%. The seeds treated with tetrachlor benzoquinone gave a germination of 99.0%. The seeds treated with tetrachlorhydroquinone gave a germination of 98.0%.

In addition, it was found that the seeds treated with tetrachlor-p-benzoquinone gave seedlings with longer sprouts and longer roots than the untreated seed, which can be ascribed to a stimulating or hormone effect. This effect has not been observed in tests made with other halogenated quinones. This so-called hormone action of tetrachlor-p-quinone allows of its use in the treatment of seeds generally.

Comparative tests on pea seed, "Wilt Resistant Perfection," for percentage germination in very moist soil, using a dosage of .25% by weight of seed protectant, showed the following:

|  | Average percent. germination after 10 days |
|---|---|
| Control (untreated seed) | 16 |
| Monochlor-benzoquinone | 6 |
| 2,6 dichlor-benzoquinone | 10 |
| 2,5 dichlor-benzoquinone | 14 |
| Tetrachlor-p-benzoquinone | 78 |
| Tetrachlor-o-benzoquinone | 64 |
| Buffered tetrachlor-p-benzoquinone | 83 |

Further, the seed protectant index (product of the germination fraction and the average height) for the buffered tetrachlor-p-benzoquinone was 2.640, .187 for monochlor-p-benzoquinone, .228 for 2,6-dichlor p-benzoquinone, .381 for 2,5-dichlor-p-benzoquinone, and .039 for the untreated seed. In a similar test in soil tetrachlor-p-benzoquinone gave a seed protectant index of 3.298 as against .127 for the untreated seed.

When tetra-chlor-p-benzoquinone is used with an anti-acid buffer or mildly alkaline compound, it can be successfully used as a foliage fungicide, as a seed protectant for vegetable, fruit, and flower seeds, and as a soil protectant. Incorporation of as little as .03% of such a mix into soil will protect seed planted in that soil from pathogenic fungi without injuring the root system. As distinguished from formaldehyde and chlorpicrin, which are volatile and injurious to seed and which require a lapse of some time before planting seeds, the present mix can be applied to soil at all temperatures thereof, and seed planting can be begun at once. Hence the present mix is considered the most outstanding organic fungicide for use in agriculture.

Further advantages and properties of the tetrachlor-p-quinone mix with anti-acid buffer or mildly alkaline compound are as follows: The mix is non-toxic to human beings; the fungicidal properties of the mix are universal, i. e., it kills or controls a large variety of fungi, although its bactericidal properties are specific. The fungi that may be controlled by buffered tetrachlor-p-benzoquinone include the following:

NAME OF FUNGUS

A. *Diseases of roots and underground parts*

Rhizoctonia solani
Fusarium solani var. martii-2
Fusarium solani var. martii-3
Pythium ultimum
Glomerella gossypii
Fusarium conglutinans
Ascochyta pinodella
  or
Mycosphaerella pinoides
Aphanomyces euteiches
Fomes lignoses B. *Seed-borne diseases*

Glomerella gosypii

C. *Foliage, stem and fruit diseases*

Sclerotinia homeocarpe
Sclerotinia fruticula
Gymnosporangium juniperivirginianae
Venturia inaequalis
Physalospora cydoniae
Elsinoe fawcetti
Coccomyces hiemalis
Sclerotinia Sclerotiorum
Alternaria solani
  or
Macrosporium solani
Phytophthora infestans
Cercospora apii
Septoria apii
Valsa cincta
Valsa leucostoma
Ascochyta pinodella
Uromyces phaseoli
Cladosporium carpophilum
Peronospora tabacina
Diplocarpon rosae
Sphaerotheca pannosa
Peronospora sparsa
Heterosporium iridis
Fomes lignosus
Polyporus zonalis
Ovulinia azalae D. *Non-parasitic or weakly parasitic fungi*

Macrosporium sarcinaeforme
Aspergillus sp.
Penicillium sp.
Rhizopus nigricans

The mix of tetrachlor p-benzoquinone with anti-acid buffer or mildly alkaline compound can be applied in large dosages without causing seed injury, although the tetrachlorquinone itself is too severe for some seeds and foliage; when applied to seed it imparts a distinct yellow color which enables the grower to tell treated from untreated seed; it lubricates seed, thus obviating the use of graphite; the mix exerts hormone action, i. e., it increases the speed of emergence and the elongation of the plant, with the result that higher yields are obtainable, especially with peas, lima beans, and cotton; the use of the mix results in uniform crops, which is of importance to canners where uniform size of peas, beans, corn, cucumber, and other vegetables is important in the canning operation; since the tetrachlor-p-benzo-quinone is substantially insoluble in water it is not readily leached out during rains and the relative insolubility permits application of the mix to seed that is still moist, for example, cotton seed immediately after ginning; the mix is relatively non-volatile so that treated seed can be stored in jute bags for lengthy periods without loss of the protectant; the mix has excellent adhesion to foliage and seed and therefore requires no additional sticking agent; the mix prevents seed decay and "damping off," i. e., prevents rot of seed in soil before sprout comes out or seedling emerges and for several days after emergence during which the plant feeds on the seed; the mix not only destroys harmful seed-borne organisms, but also protects the seed while germinating against soil-born pathogenic fungi.

The above results with pea seed were further substantiated in another experiment in which Telephone Pea seed was selected which had been in storage for over four years and which was known to be heavily infested with molds and bacteria such as: *Rhizopus nigricans*, Penicillium, Aspergillus, Macrosporium, Phomas, etc. The untreated seed (100 seed) gave only 34% germination, of which only 23 were vigorous sprouts. The seed treated with .25% by weight of tetrachlorquinone gave 56% germination of which 45 were vigorous sprouts. The seed treated with tetrachlorhydroquinone gave 63.5% germination of which 40 were vigorous sprouts.

In still another experiment, samples of healthy peas of the variety "Wilt Resistant Perfection" were treated as previously described on paper towels, and then artificially inoculated with a pure culture of *Rhizoctania solani* and incubated as before. The results were as follows:

|  | Per cent germination | Number healthy sprouts |
|---|---|---|
| Untreated seed | 87 | 4 |
| Seed treated with .25% tetrachlor-p-benzoquinone | 95 | 50 |
| Seed treated with .25% tetrachlor-hydroquinone | 97 | 50 |
| Seed treated with .25% of a mixture of 1% disodium phosphate and tetrachlor-p-benzoquinone | 90 | 89 |

Similar results have been obtained with pea seed artificially inoculated with *Sclerotinia sclerotiorum* and with lima bean seed. These results were confirmed by field tests on lima beans, in which .125% of tetrachlor-p-benzoquinone containing 1% of disodium phosphate was applied to the seed. An average increase of emergence of 30% over the control was obtained, and in some cases an increase of 50% was readily apparent.

Tetrachloro-hydroquinone and tetrachloro-p-benzoquinone were found to be powerful bactericides when tested against *Bacterium pruni*, the bacterium causing bacterial leaf spot on peaches, and are effective as fungicides and bactericides in concentrations as low as 1 part in 25,600, which is equivalent to one-half ounce to 100 gallons of water.

Metal salts of the tetra halogen hydroquinone compounds other than those referred to above may be used including such as those of the hypothetical metal ammonium, sodium, potassium, calcium, magnesium, mercury, iron, aluminum, etc., particularly the water-insoluble salts.

The materials described herein may be applied undiluted, or suspended in water or other vehicle, or mixed with talc, clay and the like, or as aforesaid may be used in admixture with other parasiticidal chemicals.

Having thus described my invention, what I claim and desire to protect by Letters Patent is:

1. The method of immunizing seed against attack by fungi which comprises treating said seed with tetrachlor-para-benzoquinone.

2. The method of immunizing seed against attack by fungi which comprises treating said seed with a mixture of tetrachlor-para-benzoquinone and a mildly alkaline buffering agent.

3. The method of immunizing seed against attack by fungi which comprises treating said seed with a mixture of tetrachlor-para-benzoquinone and tetrachlorhydroquinone.

4. The method of protecting seeds, plants and soil against attack by organisms which comprises treating said material with tetrachlor-para-benzoquinone.

5. The method of protecting seeds, plants and soil against attack by organisms which comprises treating said material with a mixture of tetrachlor-para-benzoquinone and a mildly alkaline buffering agent.

6. The method of protecting seeds, plants and soil against attack by organisms which comprises treating said material with a mixture of tetrachlor-para-benzoquinone and tetrachlorhydroquinone.

7. A seed, plant and soil fungicidal composition comprising tetrachlor-para-benzoquinone as an essential active ingredient and containing a mildly alkaline buffering agent.

WILLIAM P. TER HORST.